April 9, 1940. T. R. ROBINSON 2,196,326
TWO-LEVEL EDGE GUIDE
Filed Oct. 25, 1938 2 Sheets-Sheet 1
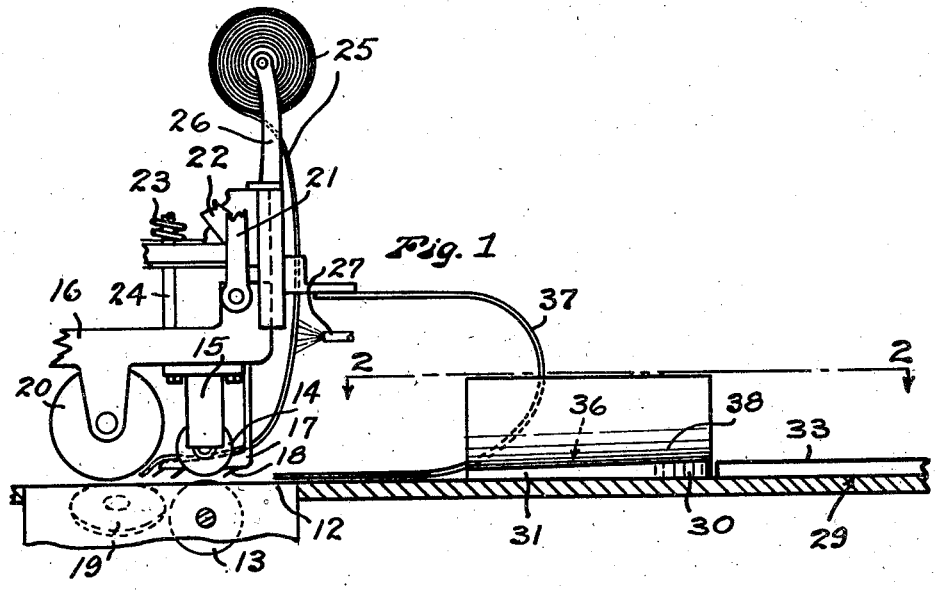
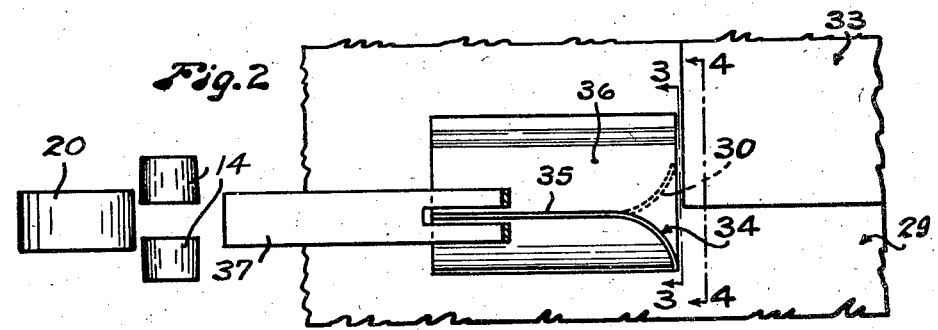
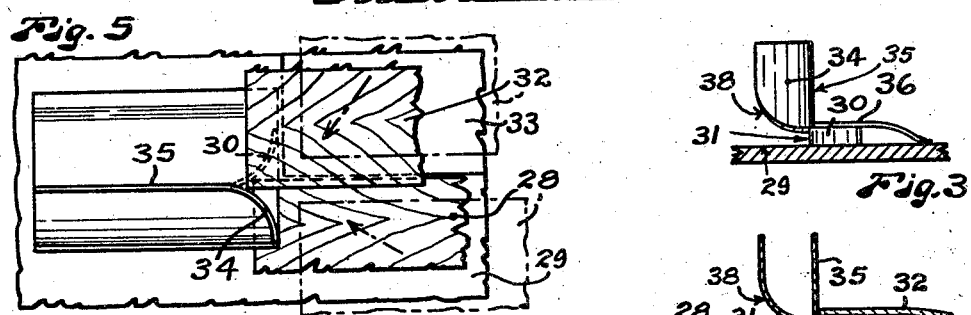
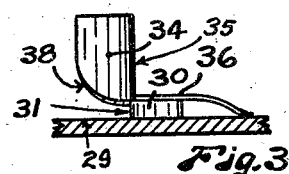
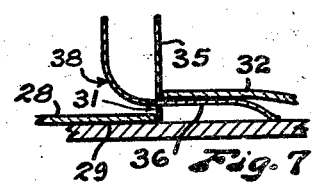
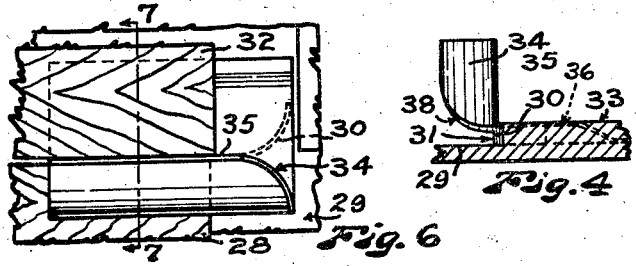
INVENTOR.
Thomas R. Robinson
BY
ATTORNEY April 9, 1940.                T. R. ROBINSON                2,196,326
                             TWO-LEVEL EDGE GUIDE
                           Filed Oct. 25, 1938         2 Sheets-Sheet 2

INVENTOR.
Thomas R. Robinson
BY
ATTORNEY

UNITED STATES PATENT OFFICE 2,196,326

TWO-LEVEL EDGE GUIDE

Thomas R. Robinson, Everett, Wash.

Application October 25, 1938, Serial No. 236,858

2 Claims. (Cl. 144—279)

This invention relates to edge guides for the adjacent edges of two sheets of material. More particularly, this invention relates to mechanism to guide pieces of material into edge to edge relationship, so that the pieces of material may be adhered together, as by edge gluing, taping or stitching.

By way of illustration only, and not as a limitation of the invention, I will set forth the invention as applicable to the edge taping of two strips of material used in forming the face ply of a piece of plywood. It is, however, to be expressly understood that the invention is not limited to such particular field of utility, but is coextensive with all fields where similar problems exist in whole or in part.

The prior art of taping together, in edge to edge relationship, two strips of veneer is in part illustrated by the following Letters Patent: Boenning, 709,864; Nystrom, 942,277; Dennis, 1,012,609; Kelly, 1,022,092; and Runne, 1,126,292.

In such prior art many devices were used to feed the tape and to urge the stock together in abutting edge to edge relationship and the present invention may be used with such prior art devices. Also in such prior art devices, and particularly in the commercial prior art, guides, as guide 61 of Dennis, have been used. Such guides are relatively thin in section and such guides were generally termed in the commercial art as "splitters". The present invention is particularly characterized by the substitution of the two level edge guide for such "splitter" of the prior art and the balance of the mechanism may follow the prior art practices.

In forming the face plies of veneer, two pieces of material are first edge jointed so they will properly fit to form a seam which will not be appreciably noticeable in the final product. Then the two abutting edges must be guided to a taping machine or edge gluing device. If the edges overlap there will be a breaking down of the corners and an imperfect joint. To eliminate this overlapping and to provide a positive limited spacing between the edges the "splitters" of the prior art were employed. However, in the event of grains extending angularly to the edge and in the event of a slight tearing of this grain, the forward thin edge of the prior art "splitter" (which must be thin to provide the desired minimum spacing) would engage the slightly torn grain and tear the same so as to ruin the piece. In other words, where the "splitter" was not used, there was the danger of breaking down the corners because of overlapping and consequent slow production in the attempt to prevent such overlapping. Also where the "splitter" was used there was the danger of torn grain. In the prior art use of taping machines with the higher priced woods, it was not uncommon to eliminate the "splitter" to eliminate the possibility of torn grain.

It is an object of this invention to provide a two level guide, where one ply is traveling on one level and the edge thereof is guided and the second ply is traveling on a vertically spaced level as respects the first mentioned level and is guided on said level.

It is a further object to provide means to bring the two plies to a common level after being guided on vertically spaced levels.

It is a further object to provide additional guiding means in the nature of curved or diverging surface members to facilitate the abutting of the edges of the stock firmly against the guides.

It is a further object of the invention to provide a guide which will positively eliminate any possibility of tearing of the grain, and at the same time with an increased rate of production.

It is a further object to provide a guide which will insure proper positioning of the stock with a minimum effort and with maximum efficiency.

The above mentioned general objects of my invention, together with others inherent in the same, are attained by the devices illustrated in the following drawings, the same being preferred exemplary forms of embodiment of my invention, throughout which drawings like reference numerals indicate like parts:

Figure 1 is a side elevation with one deck or level shown in section, and with parts broken away of a device embodying the invention;

Fig. 2 is a plan view taken substantially on broken line 2—2 of Figure 1 with parts broken away and with the feed rolls and presser rolls and the driven pressure roll detached and shown in operative position;

Fig. 3 is a sectional view taken substantially on broken line 3—3 of Fig. 2;

Fig. 4 is a sectional view taken substantially on broken line 4—4 of Fig. 2;

Fig. 5 is a fragmentary plan view with the hold down spring removed and showing two pieces of material each having a dot and dash line position and a full line position and with two indicating arrows illustrating the initial feeding of the material;

Fig. 6 is another fragmentary plan view similar to Fig. 5, but showing the two sheets of material in a later position during travel;

Fig. 7 is a sectional view taken substantially on broken line 7—7 of Fig. 6 and showing the fragments of two pieces of material in place;

Figure 8:
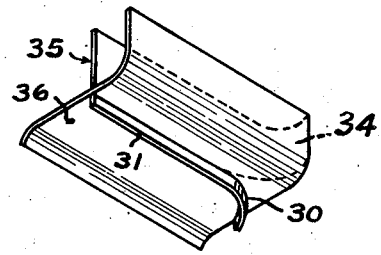
Fig. 8 is a detached bottom perspective view showing the guide member shown in the previous figures.

In view of the fact that the two level guide of this invention may be applied to various taping machines of the prior art, the taping machine proper here illustrated, by way of example, is copied substantially from the patent to Dennis, 1,012,609, and particularly Fig. 2 thereof. In the interest of brevity many of the parts of the taping machine proper are broken away.

Generally describing the operation of the taping machine proper, which forms no part of this invention, two pieces of material in adjacent edge to edge relation are supported on bed 12. As the pieces of material are urged towards the taping machine, each is urged between a driven roll 13 and presser rolls 14. The presser rolls 14 are frustro-conical in shape, with the larger diameters adjacent each other. The shape of the presser rolls is one well known expedient to urge the pieces of stock into abutting edge to edge relationship. The driven rolls 13 are supported by the bed 12 and the brackets 15 serve to support presser rolls 14. The brackets 15 are supported on the upper and adjustable frame 16. A shoe 17 is secured to brackets 15 and serves as a support for the spring fingers 18. The spring fingers 18 operate between presser rolls 14 and urge the abutting edges of the stock down against the bed 12. Bevel friction pressure roller disks 19 serve to urge the pieces of stock together as the stock passes under driven presser roll 20. The roll 20 is supported on the adjustable frame 16. The frame 16 is adjusted by levers 21 and 22 (partly broken away) to adjust the taping device to accommodate pieces of material of different thicknesses. The frame 16 is resiliently supported by springs, as spring 23, on sleeve 24. The tape 25 may be supported in the usual roll form on arm 26. The tape 25 is provided with the usual adhesive material thereon so that the same will adhere when moistened. While any of the usual means may be employed for moistening the adhesive material on the tape 25 or applying an adhesive material thereto, I prefer to use the steam jet 27, past which the tape 25 is led, to moisten the adhesive material on the tape. The tape, after being moistened, is led between presser rolls 14 and thence under driven pressure roll 20. The driven pressure roll 20 is generally heated to aid in drying of the glue on tape 25.

Figure 9:
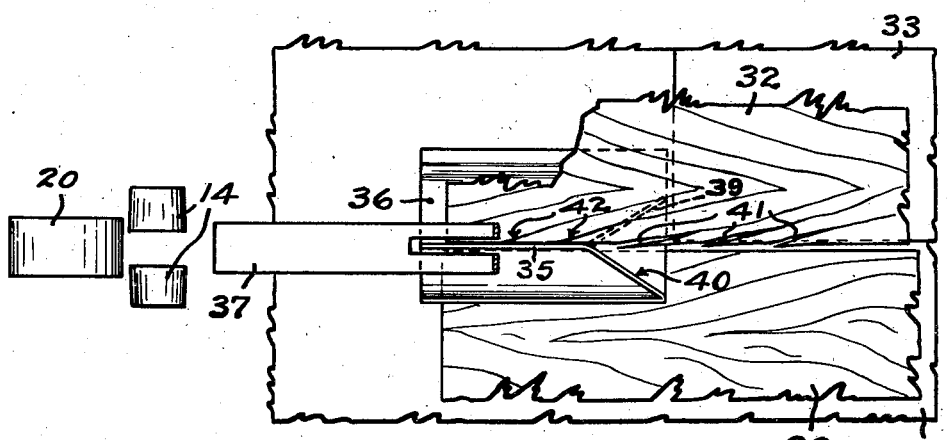
Fig. 9 is a view similar to Fig. 2 of a modified form of the invention, and showing fragments of sheets of material.

Referring to the two level guide which is the subject matter of this invention (the above general description of the taping machine proper being given to illustrate an environment of this invention) the same is shown in detached bottom perspective view in Fig. 8. A piece of material 28 is initially positioned substantially as shown by dot and dash lines in Fig. 5. The piece of material 28 rests on the lower bed or deck 29. The material is urged in the direction of the arrow in Fig. 5 into the full line position of the piece of material shown in Fig. 5. The forward inside corner portion of the piece of material 28 may engage with the curved portion 30 of the lower guide. As the material is urged forwardly and inwardly, it will follow the curved surface 30 and abut against an upright guide surface formed by the guide 31—see Figs. 5, 6 and 7. Also the forward inside corner portion of the piece of material 28 may be urged directly against the guide surface 31. At the same time, another piece of material 32 on the upper level or deck 33 will be urged forwardly and inwardly from the dot and dash line position of Fig. 5 to its full line position in Fig. 5. The forward inside corner of the piece of material 32 may engage with the curved portion 34 of the upper guide and will follow the curve 34 until the piece of material 32 abuts against the upright guide surface formed by the guide 35 on the upper level. Also the forward inside corner portion of the piece of material 32 may be urged directly against the guide surface 35. The surfaces 30 and 34 are preferably curved as shown but other angularly diverging surfaces will bring satisfactory commercial results. In Fig. 9 angularly diverging surfaces 39 and 40 replace the curved surfaces 30 and 34 and the remainder of the parts are numbered similarly to similar parts in the other figures. Also in Fig. 9, the open tears 41 in the grain are shown before the traveling board encounters the diverging surfaces, as 39 or 40, and the action of the diverging surfaces in closing such tears is illustrated by closed tears 42.

The upper deck 33 is flush with the deck 36 of the guide proper. As a means of bringing both pieces of material to a common level, the deck 36, see Figure 1, is inclined downwardly so that the piece of material 32 is directed downwardly. After the two boards, one on the lower level 29 and one on the upper level 36, pass under the spring member 37, they are urged towards a common level so that at the time the pieces pass under the presser rolls 14, they are at a common level. The guides 31 and 35 may be in a common plane or may be offset from each other to provide a slight spacing between the adjacent edges of two sheets of material. As the amount of spacing is preferably small, the prior art common level guide or splitter member was thin and the projecting end thereof caused tearing of the grain of the traveling sheets and particularly where tears and cross grains were involved. Also the splitter, due to its thin section, was fragile and of relatively short life. If the adjacent edges of the material are slightly spaced apart, still the frustro-conical shape of the presser rolls 14 and the bevel friction roller discs 19 are sufficient to urge the adjacent edges of the two pieces of material 28 and 32 into firm, abutting relationship. On the other hand, if the adjacent edges of the sheets of material 28 and 32 slightly overlap, there will be a tearing of the grain and breaking down of the corners when the two sheets are brought to a common level under the spring 37. In other words, the function of all splitters or guides is to bring the adjacent edges very close to each other, but not in abutting relation to prevent tearing of the grain. If a slight crack or space is left between the sheets this may be taken care of by the pressure means in the taping machine proper. In this device, in view of the fact that the guide for each piece of material is on a different level, the adjacent edges of the two traveling pieces of material may be brought into positive predetermined spaced relation and there is no limitation of positioning such as required by the thickness of a splitter in the prior art machines. Furthermore, due to the two levels, adhesive material may be readily applied to the edges of the sheets while the sheets are on different levels for edge gluing. As the abutting edges of the two pieces of material 28 and 32 pass under driven pressure roll 20, the adhesive tape 25 is urged into place and adheres the sheets in abutting edge to edge relationship.

In the operation of the device the sheets are fed sideways on the decks 33 and 29 to the operator and he grasps the rear portion of sheets 28 and 32. In order to provide a minimum difference in level between decks 36 and 29, the wall 38 is inclined relative to the deck 29, facilitating the insertion of warped stock against guide 31. The operator urges both sheets inwardly and forwardly in accordance with the direction of the arrows in Fig. 5. The operator may urge the sheets to engage the guides 35 and 31, or may urge the sheets in an inward direction past the guides. In the latter instance, the curved portions 34 and 30 bring the stock outwardly and the curved portions 34 and 30 serve as initial guide means. Also any torn grain will be forced back into its original position, forming a straight edge and not split as it engages the said curved portions 34 and 30. The sheets 32 and 28 are thus spaced apart a predetermined distance and are on different levels as shown in Fig. 7. The deck 36 on the upper level is inclined downwardly so that the sheets 32 and 28 are urged into a common plane by the hold-down spring 27. As the pieces of material pass between driven rolls 13 and presser rolls 14, they are urged in abutting edge to edge relationship. The spring fingers 18 between the presser rolls 14 serve to hold the two edges of the material downwardly against bed 12. Next, the moistened adhesive tape 25 contacts the joint between the two abutting pieces of material and the tape 25 is urged firmly in place and partially dried by the driven pressure roll 20.

Obviously, changes may be made in the forms, dimensions and arrangement of the parts of my invention, without departing from the principle thereof, the above setting forth only preferred forms of embodiment.

I claim:

1. A guide for positioning traveling sheet material in edge to edge relationship comprising a first deck member for supporting traveling material; a first upright guide surface for edge guiding traveling material on said first deck member; a second deck member vertically spaced from said first deck member for supporting traveling material; a second upright guide surface for edge guiding traveling material on said second deck member; and an inclined surface member connected with the second deck member to direct traveling material from the second deck member to a common level with the traveling material from the first deck member.

2. A guide for positioning traveling sheet material in edge to edge relationship comprising a first deck member for supporting traveling material; a first upright guide surface for edge guiding traveling material on said first deck member; a first diverging edge guide member connected with the forward portion of said first upright guide surface and diverging away from the first deck member; a second deck member vertically spaced from said first deck member for supporting traveling material; a second upright guide surface for edge guiding traveling material on said second deck member; a second diverging edge guide member connected with the forward portion of said second upright guide surface and diverging away from the second deck member; and an inclined surface member carried by the second deck member to direct traveling material from the second deck member to a common level with traveling material from the first deck member.

THOMAS R. ROBINSON.